June 12, 1928.  
M. L. MARTUS ET AL  
1,673,198  
PRIMARY CELL  
Filed Oct. 5, 1926
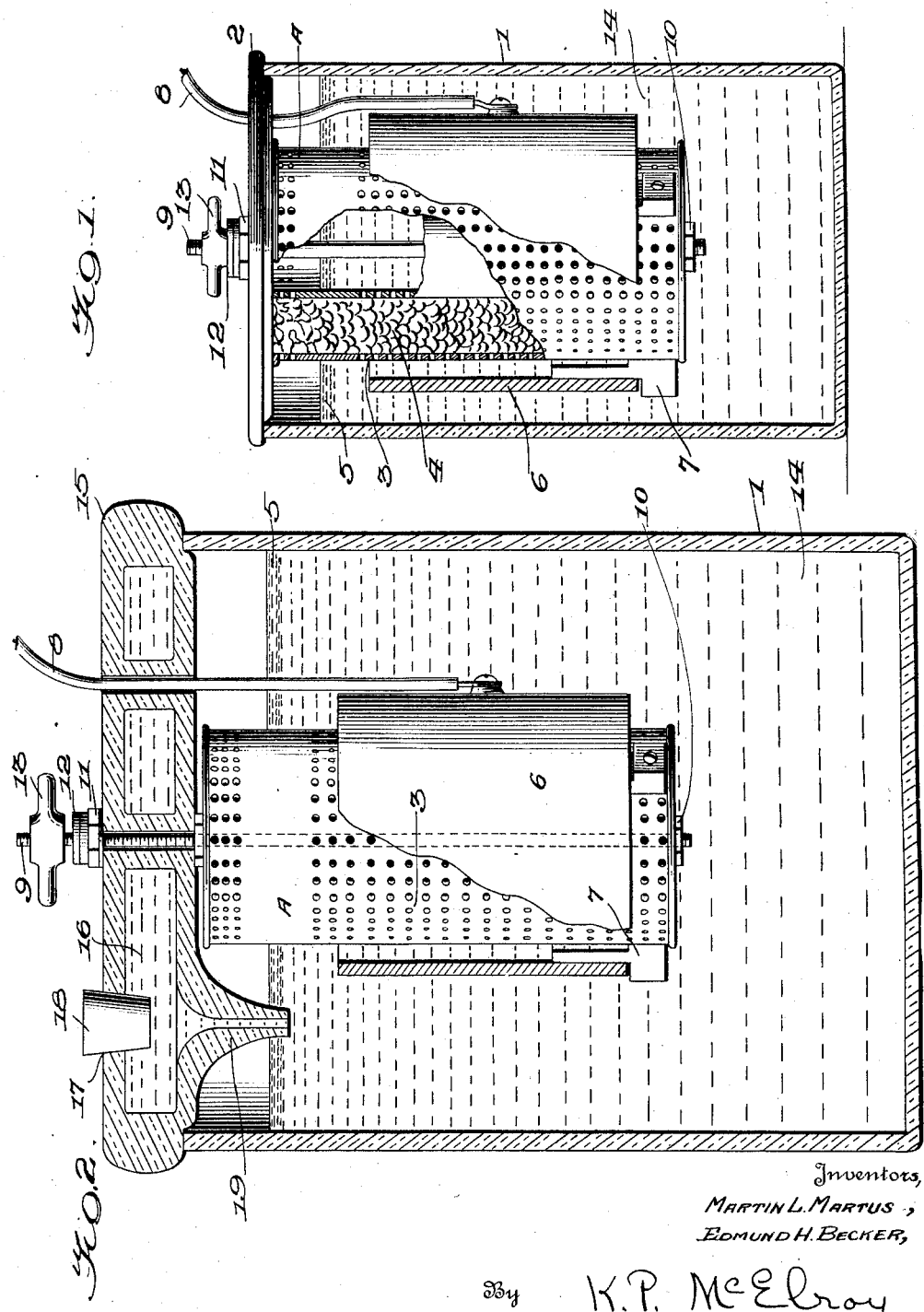
Inventors,  
MARTIN L. MARTUS,  
EDMUND H. BECKER,  
By K. P. McElroy  
Attorney Patented June 12, 1928.

1,673,198

UNITED STATES PATENT OFFICE.

MARTIN L. MARTUS, OF WOODBURY, AND EDMUND H. BECKER, OF WATERBURY, CONNECTICUT.

PRIMARY CELL.

Application filed October 5, 1926. Serial No. 139,644.

This invention relates to primary cells; and it comprises a primary cell utilizing the principle of air depolarization, said cell comprising a positive element such as zinc, an alkaline electrolyte such as caustic soda solution and a negative element of activated carbon, said activated carbon element extending above the normal electrolyte level into contact with air, means to retard evaporation of said electrolyte comprising an oil layer on the surface of said electrolyte and means to protect the carbon element from coming in contact with the oil layer; all as more fully hereinafter set forth and as claimed.

It is the object of the present invention to provide a cell of an air depolarized type having great reliability on closed circuit, not subject to damage on open circuit, of economical construction and developing a high voltage. Cells under the present invention will develop a steady voltage of 1.25. In accomplishing this result, advantage is taken of the property of a specially prepared porous carbon known as activated carbon of adsorbing, holding and transferring oxygen in an active state.

Most carbons have the power of condensing and holding and adsorbing layers of oxygen; a fact which has long been utilized in the employment of charcoal to take up and dispose of offensive vapors and in utilizing carbon for purifying liquids. Various propositions have been made to utilize this property in depolarizing primary cells; a result much to be desired, both because of the economy of using aerial oxygen and because higher voltages should be attained than are given with ordinary depolarizing materials, such as copper oxid. These attempts however, for various reasons, have not been successful in producing anything practical. Carbon is, of course, frequently used as a conductive element in making negative elements for primary cells; but it is not itself relied upon for any depolarizing effect. The carbon ordinarily employed in negative elements is, as a matter of fact, usually not very reactive for any useful chemical purpose. Its power of oxygen absorption, and particularly to the extent hereing contemplated, is negligible. Ordinary charcoal, for instance, is not sufficiently active because of the presence of adsorbed tars and oils left with the material after burning. To the extent that these tarry bodies occur, the carbon surfaces are not available for taking up oxygen. All forms of carbon are conductive for the electric current; but again, to the extent that these adsorbed matters occur, conductivity is lessened and particularly with granulated masses. In the ordinary type of carbon which has been proposed for use as an air depolarizing electrode, these tarry matters referred to exist to a considerable extent and experience has shown that air depolarization properties, while existing, are not sufficient for any practical purpose. On the other hand, an extremely clean carbon, that is, a carbon which has been ignited under mild oxidizing conditions so that practically all of the tarry matters have been driven out, has good depolarizing properties and is highly conductive, even in granular form. But it has the disadvantage that adsorbed and absorbed water reduces the oxygen-adsorbing power on which depolarization depends. Preparations of this character are used for other purposes and are known commercially as activated carbons or decolorizing carbons.

We have found, however, that it is possible to so prepare a carbon that its oxygen-adsorbing qualities are retained in a degree permitting its use as an efficient air depolarizing electrode, even after long periods of exposure to the liquid electrolyte in a cell. We have obtained a carbon which retains its high adsorbing power for oxygen for indefinite periods while immersed in the electrolyte found in cells of this type.

In preparing this carbon we may proceed in two alternative ways. An ordinary commercial decolorizing carbon, such as "Darco", which has a high adsorptive capacity for oxygen, and is readily wetted by water, may be treated with a dilute solution of an oil, such as mineral lubricating oil, in a volatile solvent, such as carbon tetrachlorid. The volatile solvent dilutes the fixed oil and allows convenient uniform incorporation of the proportion of fixed oil we desire to retain in the carbon. After incorporation, the volatile solvent is allowed to evaporate, leaving a small amount of lubricating oil in or on the surface of the carbon. We have found that in the presence of this small amount of oil, which is probably all adsorbed, aqueous liquids no longer exert a displacing effect on adsorbed oxygen. The adsorbed film is of practically molecular thickness, and is present to such a slight extent that it does not interfere with the gas-adsorbing properties of the material. To gases, it is quite pervious.

In one specific embodiment of our invention, we treat a suitable quantity, say 60 parts by weight, of a commercial activated carbon, such as Darco, with 15 parts by weight of a mineral oil diluted or thinned by the addition of 120 parts by weight of a diluent such as carbon tetrachloride. As the mineral oil, an asphaltic base oil having a viscosity range of 90 to 100 is useful. The carbon is immersed or soaked in the diluted oil until the oil solution is substantially completely taken up by the carbon. The solvent is then caused or allowed to evaporate, leaving the oil in or on the surfaces of the carbon. Because of the great surface area per unit weight in activated carbons, the 1 to 4 weight ratio of oil to carbon given in the example, while seemingly large, does not give more than a small amount of oil retained in or on a unit surface area of the carbon that is, no surface layer of any substantial thickness can exist. We may alternatively proceed by impregnating the activated carbon with lubricating oil and then washing the carbon with a volatile solvent, such as benzol, gasoline, carbon tetrachlorid, etc. so as to re-extract most of the oil and to get a uniform distribution of the small residual amount of oil left throughout the carbon mass. Washing is not conducted to such an extent that the last traces of lubricating oil are removed.

This carbon so prepared has unusual properties. Whereas ordinary activated carbon rapidly absorbs water, and its oxygen-adsorbing qualities are thereby lessened, the new carbon, possessing a small amount of adsorbed fixed oil, is not readily wet by water, whereas the same carbon in an untreated form is wet at once. The new carbon is wet by water or aqueous electrolytes to a sufficient extent to give free conductivity when the material is used as an electrode; but it does not absorb and adsorb water with the readiness of untreated carbon. The "oiled" carbon has not lost its efficiency, however, for adsorbing oxygen from the air. As an electrode in a cell, it exhibits depolarizing activity, not alone when first used, but throughout the life of the cell, provided it has an extension into the air. In some way, the presence of the adsorbed oil provides or permits an avenue for the translocation of adsorbed aerial oxygen from the point where it is taken up from the air to a point in contact with the electrolyte where the actual depolarization occurs.

The new type of carbon is particularly advantageous for use in the type of cell employing an electrolyte of caustic soda solution and electrodes of amalgamated zinc. Amalgamated zinc is not attacked by alkali solutions, even on open circuit, to any material extent. Cells of this type are ordinarily employed with copper oxid as a depolarizer. Such cells, however, give rather a low steady voltage and are not well adapted to open circuit. On open circuit, the slight solubility of copper oxid in caustic alkali solution causes, in time, a migration of copper to the zinc and consequent local action. With the new depolarizing element, the steady voltage is approximately that corresponding to aerial oxidation of zinc, namely, about 1.25 and there is practically no local action, even on long-continued open circuit.

In cells with an alkaline electrolyte, such as the ordinary copper oxid type of cell, it is customary to use a floating layer of oil to restrict evaporation and prevent encrustation of salines. In the present type of cell, we can use oil also for the same purposes; but in order to avoid this oil gaining access to and clogging the electrode which extends through it into the air, it is necessary to employ special expedients. Liquid oil is not wanted on the carbon surfaces carrying absorbed oil.

In practical embodiments of the invention, utilizing our newly prepared carbon in a primary cell, there may be used the construction shown in the appended drawings. In this showing Figure 1 is a view in vertical section with certain parts in elevation and certain other parts broken away to show the structure; and Figure 2 is a similar view of a modification employing feed mechanism to maintain constant feed of electrolyte.

Referring first to the structure shown in Fig. 1, element 1 is an ordinary battery jar of any convenient non-conductive material, such as glass, ceramic material, etc. A glass jar is shown. It is provided with cover 2 of porcelain, glass or other insulating material, closing it at the top and supporting the cell elements. The closure is not absolutely tight, since with hermetic sealing the cell would go out of operation. Experience has shown, however, that the amount of air leakage occurring with an ordinarily loose cover is usually enough to keep the oxygen in the contained atmosphere replenished to a sufficient extent for the present purposes. In this embodiment of my invention, the self-depolarizing negative element is composed of a perforated, annular, metal element 3 containing a body of granular, treated carbon 4. It is desirable that the granular mass in the basket 3 be put under a slight pressure to improve granule-to-granule conductivity and facilitate oxygen passage. Increased conductivity due to pressure contact may be obtained by tightly packing the carbon granules in the basket. The basket may be of perforated sheet iron. As shown, it will be noted that the metal sleeve is not perforated at A. Imperforate metal extends above and below the normal level of a floating oil seal 5 and prevents direct access of the oil to the carbon. Above A there are perforations to allow the air in the top of the cell free access to the carbon and below A the metal is again perforated to allow free communication of the electrolyte with the carbon.

The granular carbon may be molded into shape with a suitable binder and the basket 3 is not then necessary, provided means are employed to prevent contact of the floating oil seal 5 with the carbon electrode. Such means may comprise a sleeve of suitable material surrounding the electrode and positioned on the electrode where contact with the oil layer would normally occur. The width of the sleeve should not be much greater than the thickness of the oil layer.

Surrounding the negative electrode is positive element 6 of zinc in the form of an annular sleeve supported on a porcelain or hard rubber element 7. To it is connected insulated leading wire 8 passing through a hole in the cover. This hole is preferably made slightly larger in diameter than the conducting wire which passes through it in order to provide positive means to permit air to enter the cell. The electrical elements are shown as supported by an axially disposed rod 9 passing through the assemblage and carrying nut 10 at its base. At the top it passes through lock nut 11. Washers 12 and wing nut 13, disposed on the rod 9, serve as a means for obtaining an electrical connection. The rod 9 may be made of any suitable metal, such as copper, to serve as a conductor to the negative electrode The cell contains electrolyte 14 which may be any usual type of caustic soda or caustic potash solution. A 20 per cent solution of caustic soda is convenient In the structure just described, reliance for depolarization is placed on the oxygen adsorbed by the upper levels of the mass of carbon granules 3 and transferred downwardly. Oxygen is supplied to the carbon by the air in the top of the cell. For replenishment of oxygen in this atmosphere, reliance is placed on diffusion through the loose joints, such as that around the insulated wire, that between the cover and the top of the jar, etc. Sometimes we supplement these leakages with orifices in the cover (not shown). With inward diffusion of air, however, there is also outward diffusion of water from the moist carbon at the top of the electrode. The floating oil does not, of course, obviate this source of loss of water.

In the type of cell shown in Fig. 2, we employ means for replenishing the evaporation of water and to this end, we use a special type of cover. The cell of this figure is better adapted for heavy duty than that of Fig. 1, since freer access of air may be provided. This is advantageous, since the amperage which can be delivered is proportionate to the amount of oxygen adsorbed by the carbon surfaces. In the structure of Fig. 2, the several elements are mostly the same as in Fig. 1, and in that event bear the same reference numerals. It will be noted, however, that the cover 15 is entirely different. It is made hollow to contain a body of water 16. Opening 17, closed by cork 18, allows replenishment of this body of water. From the cover depends outlet 19, depending to a point below the normal liquid level of the cell. It acts as what is sometimes known as a bird fountain feed, replenishing the electrolyte when its volume diminishes by evaporation.

The particular cover 15 described has water replenishing means integral with it as shown. If desired an ordinary cover, such as the one shown in Fig. 1 may be used, the water evaporated from the cell being continuously replaced by the use of inverted water-filled bottles disposed above the cover and having their necks projecting through the cover and terminating below the surface of the electrolyte. Such an alternative arrangement does not possess the simplicity and convenience of the integral cover shown in Fig. 2 but the alternative arrangement may be used.

What we claim is:—

1. A self-depolarizing primary cell having an electrolyte of caustic alkali and a negative element of activated carbon, said element extending above the normal electrolyte level.

2. A self-depolarizing primary cell having an electrolyte of caustic alkali and a negative element of activated carbon, said element extending above the normal electrolyte level and the surfaces of said activated carbon carrying a small amount of adsorbed oil.

3. A self-depolarizing primary cell having an electrolyte of caustic alkali and a negative element of activated carbon, said element extending above the normal electrolyte level, a floating layer of oil on said electrolyte and means for preventing contact of said layer and said carbon.

4. In an air-depolarized primary cell comprising a negative element of treated activated carbon, having an adsorption power for oxygen comparable to untreated activated carbon but having a reduced water adsorption power.

5. A primary cell of the air depolarized type comprising a battery jar adapted to receive an electrolyte and electrodes, one of said electrodes being formed of a plurality of particles of activated carbon, a container for the carbon constructed of material normally impervious to air and to the electrolyte and having perforations formed below the normal electrolyte level to permit access of electrolyte to the carbon, and also perforations above the normal electrolyte level to permit access of air to the carbon, with an intermediate imperforate portion and a protective layer of oil adapted to be disposed on the surface of the electrolyte but maintained out of contact with the carbon by means of said immediate imperforate portion of the container.

6. A primary cell comprising a battery jar adapted to receive an electrolyte, a cover for the jar adapted to fit loosely thereon, a rod extending through the cover within the jar, a double walled container of material impervious to electrolyte supported on the rod, having perforations both above and below the normal level of the electrolyte to permit the access of air and of electrolyte to corresponding portions of the interior of the container with an intermediate imperforate portion, activated carbon within the container, said carbon being coated with a small amount of oil, a supporting member mounted within the jar by means of the rod, and a metallic electrode disposed on the support circumferentially around the container.

7. A primary cell of the air depolarized type comprising a battery jar adapted to receive an electrolyte, a cover adapted to fit loosely on the jar and permit access of air, a container for an electrode depending from the cover, said container being continuous and impermeable to fluids adjacent the normal electrolyte level, said container having perforations formed both above and below the normal electrolyte level to permit the access of air and electrolyte therewithin, activated carbon disposed within the container, means attached to the container for supporting an electrode, and means for supplying liquid to the jar to compensate for losses of the electrolyte occuring through evaporation.

8. A primary cell of the air depolarized type comprising a battery jar adapted to receive an electrolyte and electrodes, one of said electrodes being formed of a plurality of particles of activated carbon, a metal container for the carbon having perforations formed below ther normal electrolyte level to permit access of electrolyte to the carbon, and also perforations above the normal electrolyte level to permit access of air to the carbon, with an intermediate imperforate portion and a protective layer of oil adapted to be disposed on the surface of the electrolyte but maintained out of contact with the carbon by means of said immediate imperforate portion of the container.

9. A primary cell of the air depolarized type comprising a battery jar adapted to receive an electrolyte and electrodes, one of said electrodes being formed of a plurality of particles of activated carbon, an electrically conductive container for the carbon made of material impervious to electrolyte, said container having perforations formed below the normal electrolyte level to permit access of electrolyte to the carbon, and also perforations above the normal electrolyte level to permit access of air to the carbon, with an intermediate imperforate portion and a protective layer of oil adapted to be disposed on the surface of the electrolyte but maintained out of contact with the carbon by means of said immediate imperforate portion of the container.

10. A primary cell comprising a container, electrolyte disposed therein, a layer of oil on the surface of the electrolyte and sealing the same from contact with air, a depolarizing element projecting through said layer of oil into the air and electrolyte, and means protecting the depolarizing element from contact with the oil.

11. A primary cell comprising a container, electrolyte disposed therein, a layer of oil on the surface of the electrolyte and sealing the same from contact with air, a depolarizing element projecting through said layer of oil into the air and electrolyte, and a protective sleeve positioned around the depolarizing element to prevent contact of said oil and depolarizing element, said sleeve projecting into the electrolyte and the air.

12. A voltaic cell of the air depolarizer type comprising a container, a cover therefor, an electrolyte within the container, electrodes depending from said cover into said electrolyte, a protective seal on the surface of the electrolyte, and a sleeve surrounding one of said electrodes to prevent contact of the protective seal and the electrode.

13. A voltaic cell comprising a container, a cover therefor, an electrolyte within the container, positive and negative electrodes depending from the cover in to the electrolyte, one of said electrodes being a depolarizing electrode, sealing means for the electrolyte positioned on the surface thereof, and a sleeve surrounding said depolarizing electrode throughout the extent of the sealing means.

14. A voltaic cell of the air depolarizing type comprising a container, a cover fitting on the container to prevent passage of gas therearound, a recess formed in the container and adapted to receive replenishing fluid for the cell, electrodes depending from the cover within said container, one of said electrodes being a depolarizing electrode, an electrolyte in the container contacting with the electrodes, a layer of oil on the electrolyte preventing evaporation therefrom, a protective sleeve surrounding the depolarizing electrode to prevent the contact of oil with said electrode, said depolarizing electrode projecting beyond said cover into the air and thereby providing means for exchange between said electrolyte and the air, said sleeve extending above and below the surface of the layer of oil, and means on the under side of said cover communicating with said recess and electrolyte to permit of the flow of liquid from the recess to the container.

In witness whereof we have hereunto signed our names at Waterbury, Connecticut, this 4th day of October, 1926.

MARTIN L. MARTUS.
EDMUND H. BECKER.